April 10, 1934.     C. W. DAKE     1,954,665

METHOD OF PRODUCING BRAKE DRUMS

Filed July 25, 1932     2 Sheets-Sheet 1

Inventor
Charles W. Dake
by Liverance
and
Van Antwerp
Attorneys

April 10, 1934.  C. W. DAKE  1,954,665
METHOD OF PRODUCING BRAKE DRUMS
Filed July 25, 1932   2 Sheets-Sheet 2

Inventor
Charles W. Dake
By Liverance and
Van Antwerp
Attorneys

Patented Apr. 10, 1934

1,954,665

UNITED STATES PATENT OFFICE 1,954,665

METHOD OF PRODUCING BRAKE DRUMS

Charles W. Dake, Grand Haven, Mich., assignor to Campbell, Wyant & Cannon Foundry Company, Muskegon Heights, Mich., a corporation of Michigan Application July 25, 1932, Serial No. 624,606

2 Claims. (Cl. 29—152.2)

This invention relates to the method of producing brake drums for motor vehicles and the like, and is primarily concerned with a drum in which the outer supporting portion thereof has the characteristics of mild steel for required strength and toughness, and the inner portion of the drum against which brake shoes or the like will act in practice has the high braking characteristics of cast iron, the drum being in effect an integral composite structure formed integrally as to its casting in one operation, and being later treated by a process like that used for the production of malleable iron to obtain an outer relatively tough supporting portion of high tensile strength, and finished at its inner side to present a braking surface having the braking characteristics of cast iron.

The present invention is directed to a novel method for producing such drum and to the product obtained thereby whereby a drum of inconsiderable weight and not greater than is thoroughly practical for automobile use is produced, and one which will not be readily fractured under the shocks and stresses to which it is subjected in service.

These objects and others not at this time specifically enumerated will be apparent as understanding of the invention is had from the following description, taken in connection with the accompanying drawings, in which, Fig. 1 is a central vertical section on the plane of line 1—1 of Fig. 3, of one form of apparatus by means of which I am able to carry out the process and produce the initial drum.

Figure 1:
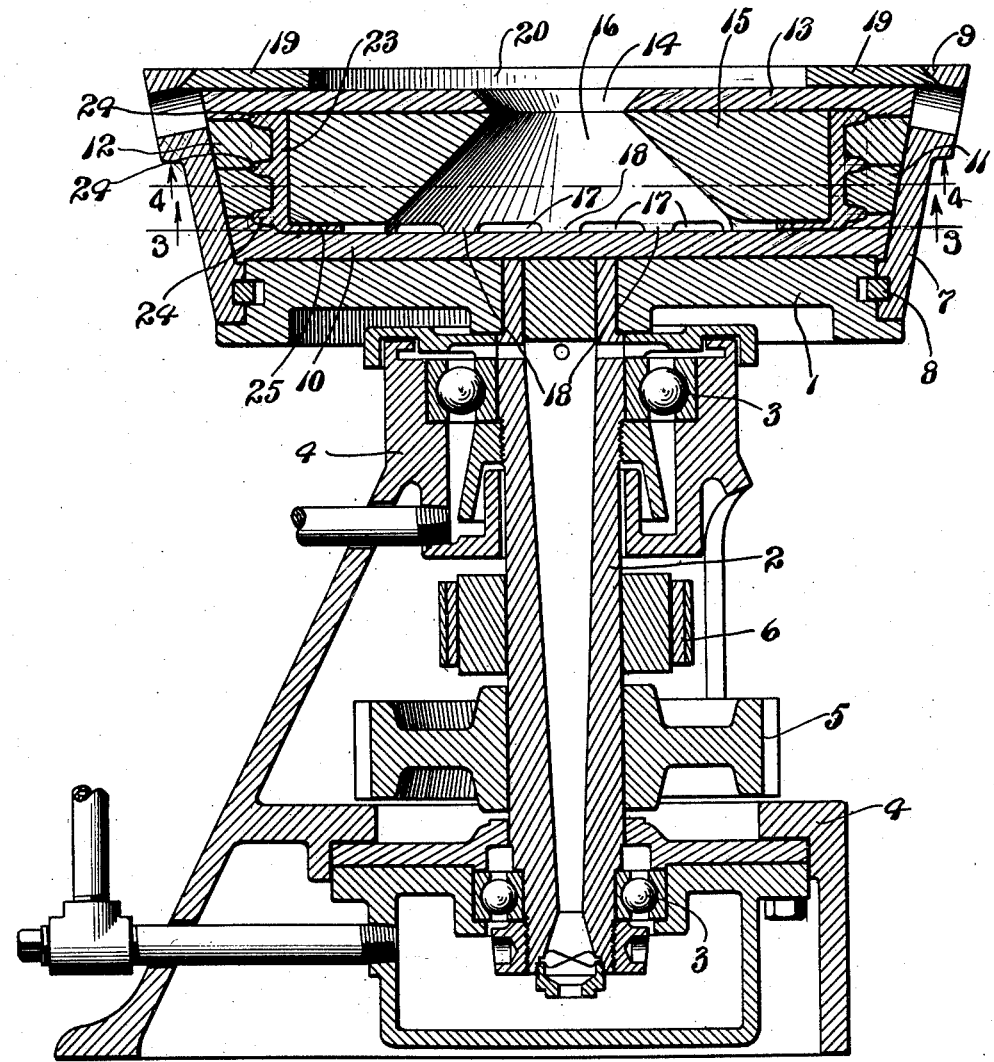
Figure 5:
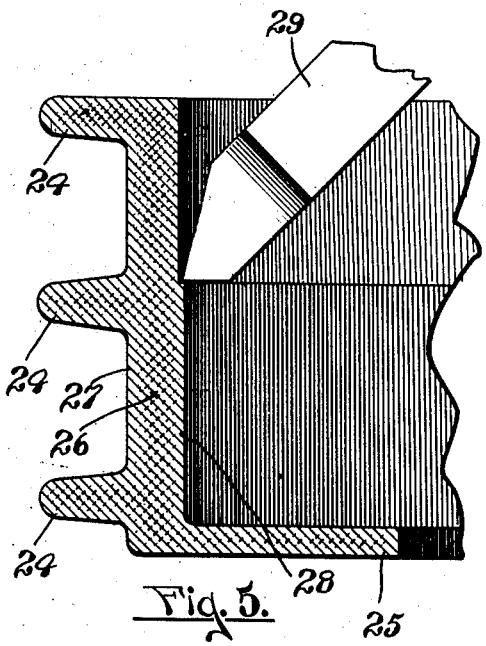
Figure 4:
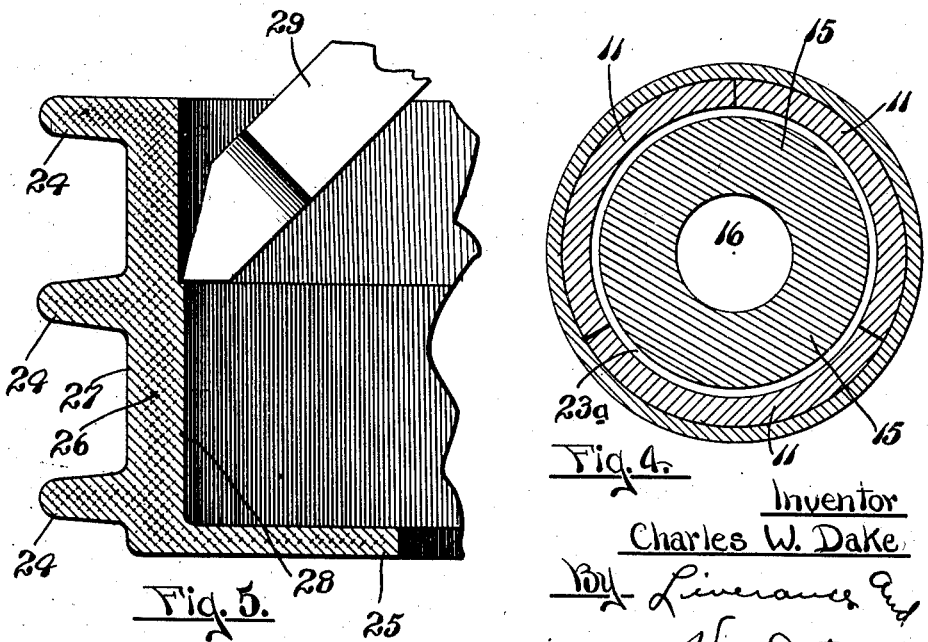

Fig. 4 is a reduced horizontal section on the plane of line 4—4 of Fig. 1 looking upwardly, and Fig. 5 is a fragmentary enlarged section illustrating the machine operation performed at the inner side of the drum after it has been subjected to the malleablizing process, whereby the inner surface portions of the drum is cut away and the surface finished to present a braking surface having the braking characteristics of cast iron.

Like reference characters refer to like parts in the different figures of the drawings.

The apparatus disclosed is a centrifugal molding device having a horizontal table 1 secured at the upper end of a vertical spindle 2 which is rotatably mounted to turn about its longitudinal vertical axis in anti-friction bearings 3 suitably mounted on a support 4. The vertical spindle 2 may be driven through any suitable power driving mechanism connected to the gear 5 which is fixed on the spindle, and the stopping the rotation may be controlled and made more rapid by utilizing a brake 6 associated with said spindle.

An upwardly and outwardly extending surrounding ring 7 is connected and locked to the peripheral portions of the table 1 by a spring ring 8 as shown and within the said ring or flange 7 a sectional composite mold is located. Such mold comprises a horizontal base 10 above and around the outer portions of which are segmental ring members 11 and 12 located one over the other; and above the upper segmental ring 12 is a circular plate 13 having a central opening 14 as shown. It will be noted that at the junctures of the outer portion of the base 10 of the mold and the segmental ring portion 12 of the mold above the same, there is provided a continuous annular groove and, likewise, between the segmental rings 11 and 12 and between the upper ring 12 and the upper plate 13 such annular grooves are provided.

A central core 15, located within the surrounding ring members 11 and 12, rests upon the base 10 and is covered by the circular plate 13. The core 15 is of cylindrical form and has a central conical opening 16 therein as shown, while at the lower side of the core a plurality of gate passages 17 are made separated by supporting feet 18 between the passages and integral with the core. These parts, when assembled, constitute a mold and the parts thereof are held securely in place by a ring 19, made up of a plurality of segments, the peripheral edges of which are inclined outwardly to fit underneath the overhanging lips 9 at the upper edges of the surrounding ring 7 serving to lock and hold the parts of the mold in position.

The core at its peripheral surface is spaced a short distance from the inner curved sides of the rings 11 and 12 and at its lower side and outer portions is spaced from the upper side of the bottom 10 making a mold cavity as shown.

Figure 2:
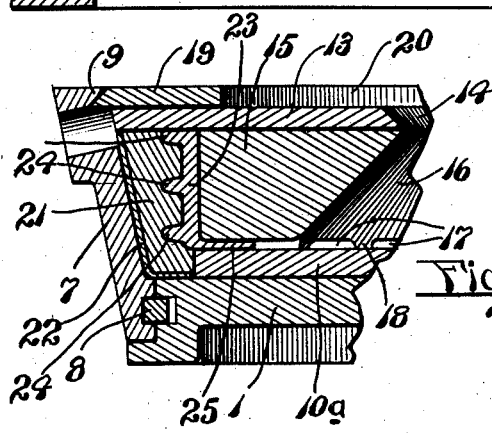
Fig. 2 is a similar fragmentary section illustrating a slight modification in the apparatus.
Figure 3:
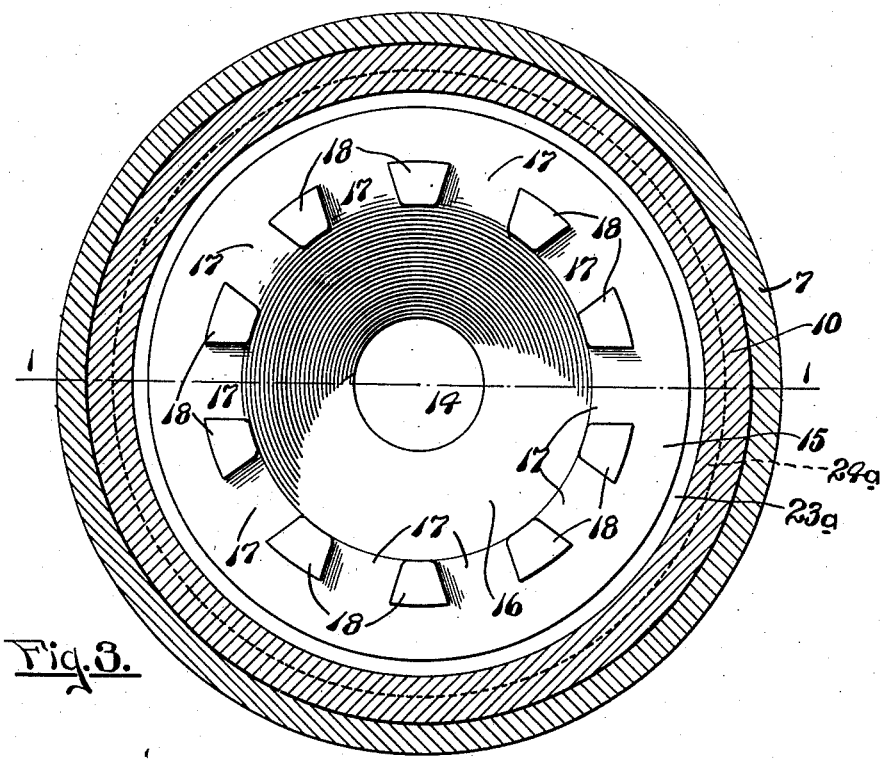
Fig. 3 is a horizontal section on the plane of line 3—3 of Fig. 1 looking upwardly.

In the slightly modified form shown in Fig. 2 the base 10a does not extend to the inner side of the surrounding ring 7, and the sides of the mold instead of being made up of a plurality of rings 11, 12 are provided in a single ring 21 grooved at its inner side; and the same may be exteriorly covered by a thin sheet metal covering 22 as shown in Fig. 2. The mold in either case, however, is in effect the same.

Melted cast iron suitably alloyed, or melted cast steel is poured through the opening at 14 into the mold coming against the upper side of the bottom 10 of the mold, and with the mold rapidly rotating, the melted iron, through centrifugal force and action, is carried through the gate passages 17 to the cavities of the mold and rises in the mold to completely fill all interstices thereof, thereby providing a cast drum 23 of cylindrical form, having continuous annular outwardly extending ribs 24 thereon, and with an inwardly extending supporting flange 25 to which, after the cast drum has been further treated in accordance with my process, a suitable back of wrought metal is secured as by welding or other equivalent permanent connection to complete the brake drum.

The cast drum 23, with its outwardly extending ribs 24 and inwardly extending flange 25, after it has been cast and has been removed from the mold, which is of separable parts, is subjected to the process ordinarily employed in the manufacture of malleable iron, whereby all exposed surfaces of the drum and the metal for a limited distance inwardly therefrom is changed in its properties and characteristics to have the properties and characteristics of a mild steel, with increased tensile strength and with greater toughness and an ability to withstand shocks, the readily breakable or brittle characteristics of cast iron, insofar as the exposed surface portions of the drum are concerned, being eliminated.

In Fig. 5 is an illustration of a cross section of the drum after it has been subjected to the malleable process, and is being subjected to the final step of the process. The inner core of the drum, indicated at 26, retains the characteristics of the cast metal from which the drum was made, while the outer and inner portions 27 and 28 of the drum have been changed to characteristics and properties similar to those of mild steel as described.

The final step of the process is to machine the inner part 28 of the drum in a lathe or other suitable apparatus, cutting the scale and so much of the drum away as will expose the harder core 26, the tool 29 shown being a conventional showing of a cutting tool used on lathes or the like.

The removal of the inner portion or surface to a depth sufficient to expose the core or body having the desired cast iron characteristic provides a brake drum with the toughness, strength and other characteristics of steel for the surrounding outer portion of the drum, and with a braking surface the characteristics of which may be varied by varying the different alloying elements which may be used in the cast iron mixture forming the brake drum, thereby producing a brake drum having desired strength and light weight and the very desirable cast iron braking surface at the inner side of the drum.

In the cast iron composition used, preferably, the main element of course is iron, but in all cast iron there are certain percentages of carbon and nearly always of silicon; and there may be small percentages of other elements in the cast iron such as phosphorus, sulphur, manganese, chromium or equivalents. Preferably the composition which I make use of shall not have less than 2 percent by weight of carbon nor more than 3.4 percent of carbon; and with respect to silicon, not more than 1.3 percent nor less than ¼ of one percent by weight of silicon. The other elements which may be present in the cast iron are of little importance except that of course sulphur and phosphorus, not being desirable elements, will be kept to a minimum as much as possible. The carbon element is necessary for the purpose of annealing the cast iron and its conversion into so-called malleable iron while silicon, as is well known to workers in cast iron, has desirable qualities in increasing the fluidity of the melted iron and softening the same whereby the central core, which is exposed by cutting away the inner side of the drum at 28, as illustrated in Fig. 5, is of a uniform texture throughout the braking surface and should change somewhat as the drum wears, it will be substantially uniform at all exposed wearing points.

While I have described the drum as having been made from cast iron it is to be understood that there are certain steels which will produce a drum similar to that shown in Fig. 5 and which will have a harder core at the inner portions of the drum flange and tougher and stronger surrounding surface portions; and that a drum made of cast steel may have the annealing process used in the manufacture of malleable iron dispensed with and may be finished by removing the inner surface of the cast steel drum to expose the core of different characteristic. And my invention is to be considered as comprehending the brake drum produced whether cast iron followed by a malleable iron annealing process is used, or cast steel wherein the solidification of steel drum produces a core of different characteristics than the surface portions.

Having fully described the invention, what I claim and desire to secure by Letters Patent is:

1. The herein described process of producing brake drums which consists in casting a brake drum of cast iron, subjecting the same to a malleablizing process for a limited time whereby the same has its characteristics changed to a predetermined depth, and then removing a portion at a chosen side of the drum flange, said portion being of such depth as to uncover the substantially unchanged original cast metal, thereby exposing a braking surface having the characteristics of cast iron and leaving an adjacent surrounding integral portion on the drum of tougher characteristics and having a higher tensile strength than the braking portion.

2. The herein described process of producing a brake drum which consists, in centrifugally casting a drum from molten iron to provide a cast iron drum, annealing said drum by subjecting the same to malleablizing process for a limited time, and removing the inner surface portions of the drum flange sufficiently to remove the annealed shell and to expose the harder inner body to provide an inner core having substantially the characteristics and properties of cast iron, said core being surrounded and integral with an outer portion having substantially the characteristics of mild steel.

CHARLES W. DAKE.